United States Patent
Song

(10) Patent No.: US 7,454,563 B2
(45) Date of Patent: Nov. 18, 2008

(54) BUFFER MANAGEMENT DEVICE, RECORD AND REPRODUCTION APPARATUS AND MANAGEMENT METHOD FOR BUFFER MEMORY

(75) Inventor: Fong-Hwa Song, Tucheng (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 251 days.

(21) Appl. No.: 11/453,640

(22) Filed: Jun. 14, 2006

(65) Prior Publication Data
US 2006/0291819 A1    Dec. 28, 2006

(30) Foreign Application Priority Data
Jun. 23, 2005    (TW) ............................... 94120904 A

(51) Int. Cl.
*G06F 12/00*    (2006.01)

(52) U.S. Cl. ........................ 711/112; 711/111; 711/168; 711/169; 710/52; 710/56; 386/125; 386/126

(58) Field of Classification Search ................. 711/105, 711/111, 112, 168–169; 710/52, 56; 386/124–126
See application file for complete search history.

(56) References Cited

U.S. PATENT DOCUMENTS

| | | | |
|---|---|---|---|
| 6,216,201 B1 | 4/2001 | Ado et al. .................... 711/112 |
| 6,330,640 B1 * | 12/2001 | Williams et al. ............. 711/112 |
| 6,332,196 B1 * | 12/2001 | Kawasaki et al. ........... 713/300 |
| 6,661,964 B1 * | 12/2003 | Otsuka ........................ 386/46 |
| 2003/0165330 A1 * | 9/2003 | Ju ............................... 386/98 |
| 2005/0166255 A1 * | 7/2005 | Hallberg et al. ............. 725/134 |

* cited by examiner

*Primary Examiner*—Jasmine Song
(74) *Attorney, Agent, or Firm*—J.C. Patents

(57) ABSTRACT

A buffer management device of record and reproduction apparatus for an optical storage medium and a management method for a buffer memory are provided. By employing two sets of pointers to manage the parts of the buffer memory needed for decoding and encoding respectively, the buffer memory inside the record and reproduction apparatus such as a DVD drive has a better efficiency of switching between the read operation and the write operation.

20 Claims, 5 Drawing Sheets

BUFFER MANAGEMENT DEVICE, RECORD AND REPRODUCTION APPARATUS AND MANAGEMENT METHOD FOR BUFFER MEMORY

CROSS-REFERENCE TO RELATED APPLICATION

This application claims the priority benefit of Taiwan application serial no. 94120904, filed on Jun. 23, 2005. All disclosure of the Taiwan application is incorporated herein by reference.

BACKGROUND OF THE INVENTION

1. Field of Invention

The present invention relates to a buffer management device inside a record and reproduction apparatus for an optical storage medium. More particularly, the present invention relates to a buffer management device and method thereof simultaneously employing two sets of pointers for respectively decoding and encoding.

2. Description of Related Art

FIG. 1 is a schematic block diagram of a readable/writable DVD drive. Referring to FIG. 1, the buffer memory 14, which may be a dynamic random access memory (DRAM), is used for registering data, and the data is accessed through the buffer memory interface 13. The buffer management device 12 includes a set of pointers and the pointers are used for indicating what operation is being executed by which part inside of the buffer memory 14.

The DVD drive reads digital data from an optical disc by using an optical pick-up (not shown). However, since the data obtained is analog signal because of the reading mechanism, the digital data is obtained by digitally dividing the analog signal by the data slicer 10.

The digital data is registered into the buffer memory 14 first under the instruction of the buffer management device 12, and then decoded by the decoder 11. Besides readable/writable DVD discs including DVD-ROM, DVD-R, DVD+R, DVD-RW, DVD+RW, and DVD-RAM etc, the DVD drive has to be backward compatible with CD discs, including CD-ROM, CD-R, CD-RW etc. However, both of the data formats are different, so the decoder 11 including a CD decoder 11a and a DVD decoder 11b are used to decode data with respect to CD discs and DVD discs, respectively. When the host 16 is about to process the decoded data, it reads the decoded data from the buffer memory 14 through the transmission interface 15 and processes it. Wherein, the host 16 may be a video signal processing chip.

When the data is about to be written into an optical disc, the data, for example, obtained from the host 16, is registered into the buffer memory 14 first according to the instruction of the buffer management device 12, and then it is sent to the encoder 17 to be encoded. As the decoder 11, the encoder 17 includes a CD encoder 17a and a DVD encoder 17b to encode data with respect to CD discs and DVD discs, respectively. The encoded data is written into the optical disc by the optical pick-up with the wobble processing unit 18 processing the wobble signal on the optical disc and the write strategy unit 19 providing the appropriate write strategy.

FIG. 2 is a view of a well-known buffer memory. Firstly, the format of an optical disc will be described. The format of an optical disc, for example, a CD disc, has 75 sectors of data per second; each sector has 98 frame data; and each frame has 24 bytes of user data. Furthermore, each frame (or sector) further comprises synchronization pattern, subcode and error correction code (ECC). Wherein, the subcode includes some control bits, e.g. time signal bit, pause signal bit, and bit for determining data format; the synchronization pattern is used for data synchronization; and the ECC is used for data error correction.

Then referring to FIG. 2, the buffer memory includes a plurality of pages, i.e. PAGE 0, PAGE 1, PAGE 2, . . . , PAGE n, and each page is used for storing a sector data. Accordingly, if taking a CD disc as an example, each page of the buffer memory stores 98*24=2352 bytes of user data.

The data is registered into the buffer memory 14 as shown in FIG. 1 after it has been read from the optical disc by the drive, and then it is decoded. During the decoding operation, the sector pointer 21 will point to the PAGE 0 first, here the data (e.g. the ECC) included in the PAGE 0 will be processed by the sector processing unit (not shown) in the buffer management device 12; after the process is done, the sector pointer 21 will point to the PAGE 1 to process the data with respect to the PAGE 1, thus it will continue until the PAGE n is processed before it goes back to the PAGE 0 to process sequentially again. Therefore, such kind of buffer memory 14 is called a ring buffer.

For example, when the sector pointer 21 has finished processing the PAGE 0 and is pointing to the PAGE 1, the read/write pointer 22 will point to the PAGE 0 following the sector pointer 21. Here, the PAGE 1 is processed by the sector processing unit since it is pointed by the sector pointer 21, and the PAGE 1 is decoded by the decoder 11 since it is pointed by the read/write pointer 22. When the read/write pointer 22 points to the PAGE 2 (or when the sector pointer 21 points to the PAGE 3), the host pointer 23 will start following the read/write pointer 22 (or the sector pointer 21) to point to the PAGE 0, indicating the host 16 is processing the data with respect to the PAGE 0 (e.g. the decoded data). Then, the 3 pointers sequentially process the data registered in the buffer memory 14 in the sequence of the sector pointer 21, the read/write pointer 22, and the host pointer 23. In other words, each page of the buffer memory 14 is always pointed by the sector pointer 21 first, then by the read/write pointer 22, and finally by the host pointer 23; and it is pointed repeatedly by the pointers in the aforesaid sequence and processed correspondingly.

When the drive is about to write data into an optical disc, the data is first registered in the buffer memory 14 as shown in FIG. 1 and then is encoded. During the encoding operation, the 3 pointers process the data registered in the buffer memory 14 in the opposite sequence of the decoding operation, i.e., the pointers process the pointed page respectively in the sequence of the host pointer 23, the read/write pointer 22, and the sector pointer 21. However, here the page pointed by the read/write pointer 22 is encoded by the encoder 17.

Although a CD optical disc has been taken as an example, a DVD optical disc can be done likewise, the only difference is that the bytes of user data of each page of the buffer memory are different from that of the CD optical disc because of the different format of the DVD optical disc, but the operation flow can be deduced.

Thus, if a readable/writable DVD drive is about to realize the time shift function (i.e. playing and recording simultaneously), for example, when someone is watching TV program, if the she/he has to leave temporarily, she/he records the TV program in order not to miss it and wishes to continue watching the TV program from where she/he has left at once she/he comes back, here the DVD drive may need to record the playing TV program on the one hand, in another hand it has to play the previously recorded program for the viewer. The well-known practice is to accomplish the time shift function by adopting data-accessing speed higher than playing speed. However, if there are too many faults with the data on the optical disc or the optical disc itself has too many defects, the duty of data recovery will be too heavy that the data-accessing speed is reduced, resulting in frame skips or frame stops when playing images. Moreover, since there is only one set of pointers, the functioning performance will be further reduced because switching between the read operation and the write operation requires initializing the pointer to point to the page of the buffer memory when playing and recording simultaneously.

SUMMARY OF THE INVENTION

The present invention is directed to provide a buffer management device, a record and reproduction apparatus for an optical storage medium, and a method for managing a buffer memory, so that when the record and reproduction apparatus (e.g. a readable/writable DVD drive) reads and writes simultaneously, the efficiency of switching between the read operation and the write operation of the buffer memory is improved and the incoherent feeling of playing images is avoided.

The present invention provides a buffer management device which is used for managing a buffer memory inside a record and reproduction apparatus for an optical storage medium. The buffer memory includes a decoding buffer and an encoding buffer having a plurality of pages respectively. The buffer management device includes a set of decoding pointers and a set of encoding pointers. When the record and reproduction apparatus is recording (or writing) data into and reproducing (or reading) data from the optical storage medium, the buffer management device will access the buffer memory by using the decoding pointers and the encoding pointers simultaneously.

Wherein, the set of decoding pointers includes a sector decoding pointer for indicating which page of the decoding buffer is used for processing sector data, a read decoding pointer for indicating which page of the decoding buffer is used for reading data, and a host decoding pointer for indicating which page of the decoding buffer is used by a host for processing data.

Wherein, the set of encoding pointers includes a sector encoding pointer for indicating which page of the encoding buffer is used for processing sector data, a write encoding pointer for indicating which page of the encoding buffer is used for writing data, and a host encoding pointer for indicating which page of the encoding buffer is used by the host for processing data.

The present invention provides a record and reproduction apparatus for an optical storage medium. The record and reproduction apparatus includes a read/write unit, an encoding unit, a decoding unit, a buffer memory, a buffer memory interface and the above-mentioned buffer management device of the present invention. Wherein, the read/write unit is used for physically writing data to or reading data from the optical storage medium. The encoding unit is used for encoding the data before writing the data into the optical storage medium. The decoding unit is used for decoding the data after reading data from the optical storage medium. The buffer memory includes a decoding buffer and an encoding buffer, and the decoding buffer and the encoding buffer include a plurality of pages respectively. The buffer memory interface is coupled to the buffer memory and the buffer management device.

The present invention provides a management method for a buffer memory, which is used for managing the buffer memory inside a record and reproduction apparatus for an optical storage medium. The management method for buffer memory includes the following steps: providing the buffer memory including a decoding buffer and an encoding buffer, in which the decoding buffer and the encoding buffer include a plurality of pages respectively; providing a set of decoding pointers including a sector decoding pointer for indicating which page of the decoding buffer is used for processing sector data, a read decoding pointer for indicating which page of the decoding buffer is used for reading data, and a host decoding pointer for indicating which page of the decoding buffer is used by a host for processing data; providing a set of encoding pointers including a sector encoding pointer for indicating which page of the encoding buffer is used for processing sector data, a write encoding pointer for indicating which page of the encoding buffer is used for writing data, and a host encoding pointer for indicating which page of the encoding buffer is used by the host for processing data.

When the record and reproduction apparatus is reading data from the optical storage medium, firstly the data is registered into the decoding buffer of the buffer memory. Any page of the decoding buffer used for registering the data will be pointed by the sector decoding pointer, the read decoding pointer and the host decoding pointer sequentially and processed correspondingly. In addition, when the record and reproduction apparatus is writing data into the optical storage medium, firstly the data is registered into the encoding buffer of the buffer memory. Any page of the encoding buffer used for registering the data will be pointed by the host encoding pointer, the write encoding pointer and the sector encoding pointer sequentially and the processed correspondingly. Moreover, when the record and reproduction apparatus is recording data into and reproducing data from the optical storage medium, the buffer management device will access the buffer memory by using these decoding pointers and encoding pointers simultaneously.

By employing two sets of pointers to manage the parts of the buffer memory needed for decoding and encoding respectively, the buffer memory has a better efficiency of switching between the read operation and the write operation.

In order to the make the aforementioned and other objects, features and advantages of the present invention comprehensible, a preferred embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

For the convenience of description, an optical disc is taken as an example of the aforesaid optical storage medium, and a readable/writable DVD drive is used as an example of the record and reproduction apparatus thereof.

Figure 1:
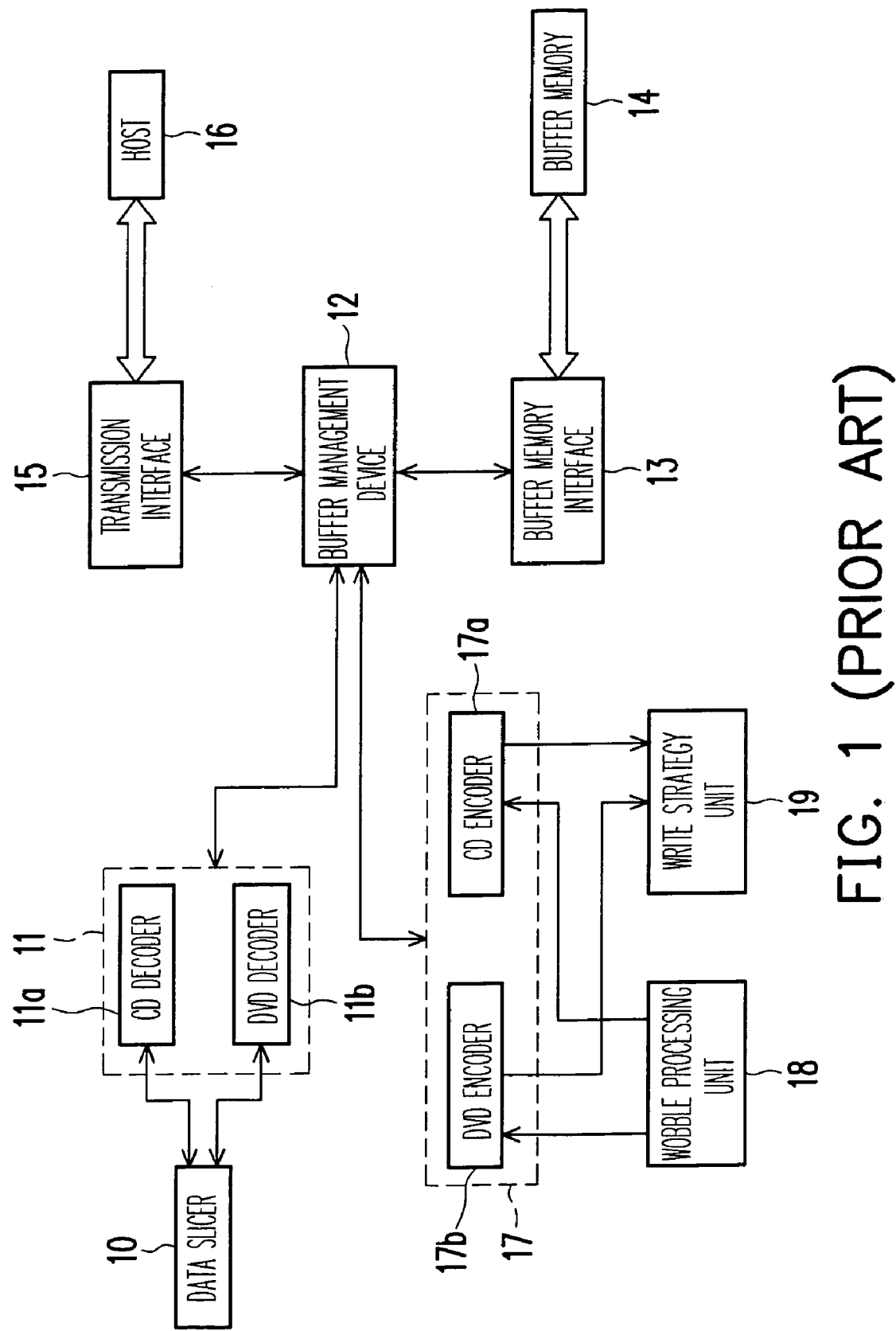
FIG. 1 is a schematic block diagram of a DVD drive.
Figure 2:
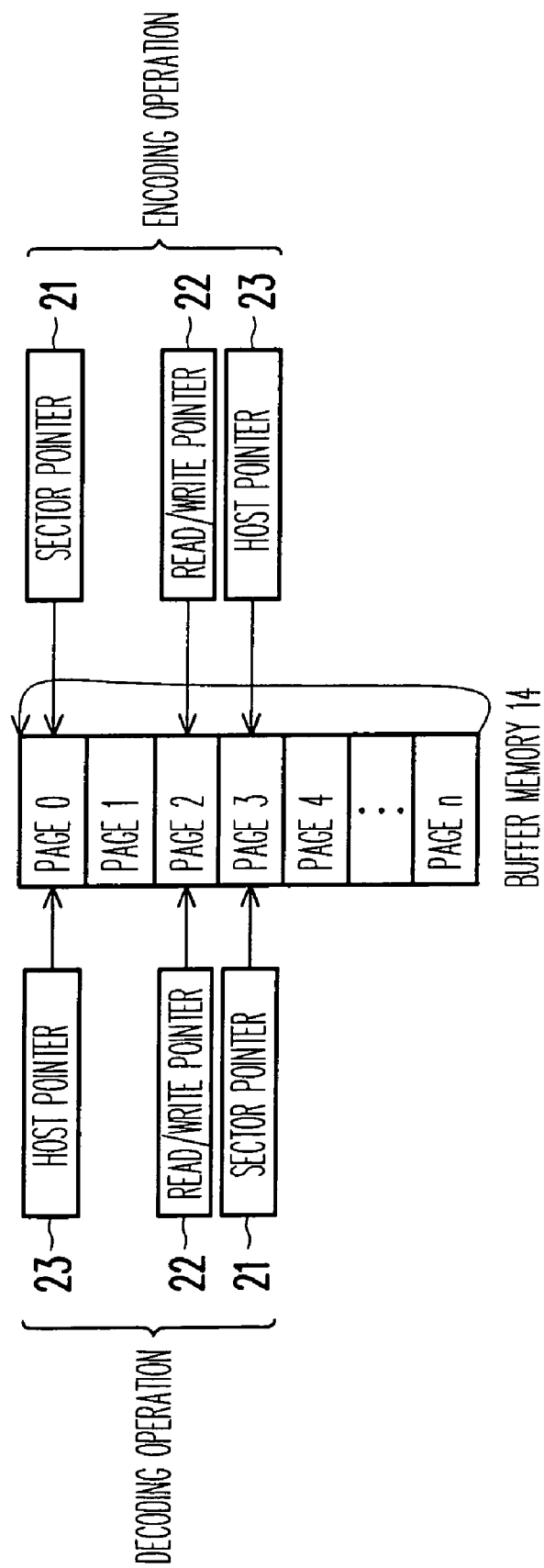
FIG. 2 is a view of a well-known buffer memory.
Figure 3:
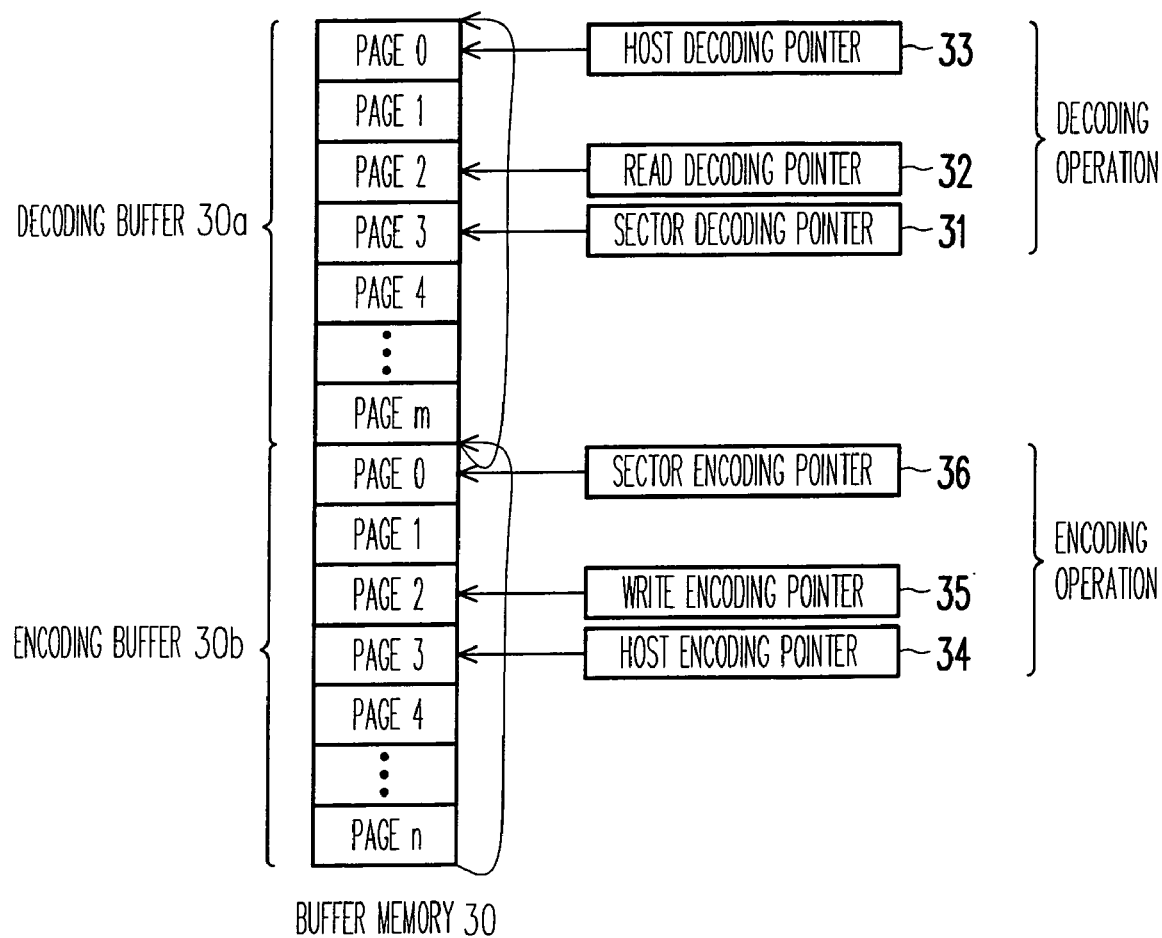
FIG. 3 is a view of a buffer memory according to exemplary embodiments of the present invention.

FIG. 3 is a view of a buffer memory according to exemplary embodiments of the present invention. Referring to FIG. 3, the buffer management device according to the present invention is adapted to the readable/writable DVD drive as shown in FIG. 1, the difference to the well-known technique is that the buffer management device in the present invention arranges a decoding buffer 30a and an encoding buffer 30b in the buffer memory 30 to register data required by the decoding operation and the encoding operation respectively. The decoding buffer 30a includes m pages, and the encoding buffer 30b includes n pages. According to general design pattern, for the convenience of management, the m pages of the decoding buffer 30a are arranged in consecutive memory space, and the n pages of the encoding buffer 30b are arranged in another consecutive memory space.

Another difference to the well-known technique is that the buffer management device of the present invention includes a set of decoding pointers for managing the decoding buffer 30a and a set of encoding pointers for the encoding buffer 30b respectively. Wherein, the decoding pointers include, for example, a sector decoding pointer 31, a read decoding pointer 32, and a host decoding pointer 33; the encoding pointers include, for example, a host encoding pointer 34, a write encoding pointer 35, and a sector encoding pointer 36. When the DVD-RAM is recording (or writing) data to or reproducing (or reading) data from an optical disc, the buffer management device will access the buffer memory 30 by using the decoding pointers 31~33 and the encoding pointers 34~36 simultaneously.

After the drive has read data from the optical disc, the data is firstly registered into the decoding buffer 30a of the buffer memory 30 and then the data is decoded. During the decoding operation, the data registered in the decoding buffer 30a is sequentially processed by the sector decoding pointer 31, the read decoding pointer 32, and the host decoding pointer 33. In other words, each page of the decoding buffer 30a is always pointed by the sector decoding pointer 31 first so that the corresponding data in the page is processed by the sector processing unit, then by the read decoding pointer 32 so that the corresponding data in the page is decoded by the decoder 11 as shown in FIG. 1, and finally by the host decoding pointer 33 so that the corresponding data in the page is processed by the host 16 as shown in FIG. 1. Then, it is pointed repeatedly by the decoding pointers in the aforesaid sequence and processed correspondingly.

When the drive is going to write data into an optical disc, the data is registered into the encoding buffer 30b of the buffer memory first, and then the data is encoded. During the encoding operation, the data registered in the encoding buffer 30b is sequentially processed by the host encoding pointer 34, the write encoding pointer 35, and the sector encoding pointer 36. In other words, each page of the encoding buffer 30b is always pointed by the host encoding pointer 34 first so that the corresponding data in the page is processed by the host 16 as shown in FIG. 1, then by the write encoding pointer 35 so that the corresponding data in the page is encoded by the encoder 17 as shown in FIG. 1, finally by the sector encoding pointer 36 so that the corresponding data in the page is processed by the sector processing unit as shown in FIG. 1. Next, it is pointed repeatedly by the encoding pointers in the aforesaid sequence and processed correspondingly.

Generally speaking, the decoding pointers further include a subcode decoding pointer (not shown), and the page pointed by the subcode decoding pointer indicates that the subcode in this page is being processed by the subcode processing unit (not shown). Since the data included in the subcode is control bytes related to the sector data, therefore each page will be pointed by the sector decoding pointer 31 only after it has been pointed by the subcode decoding pointer. Similarly, the encoding pointers further include a subcode encoding pointer (not shown), and each page can only be pointed by the sector encoding pointer 36 after it has been pointed by the subcode encoding pointer.

Figure 4:
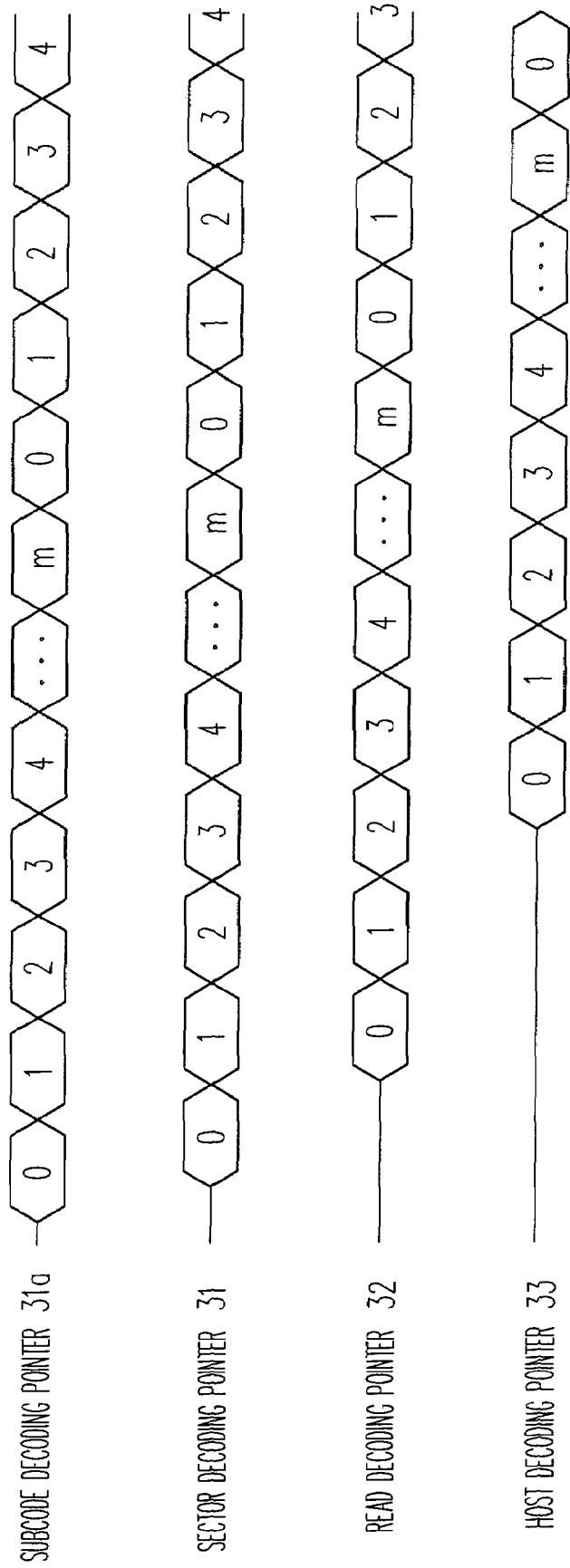
FIG. 4 is a timing diagram illustrating the decoding operation of the buffer memory shown in FIG. 3.
Figure 5:
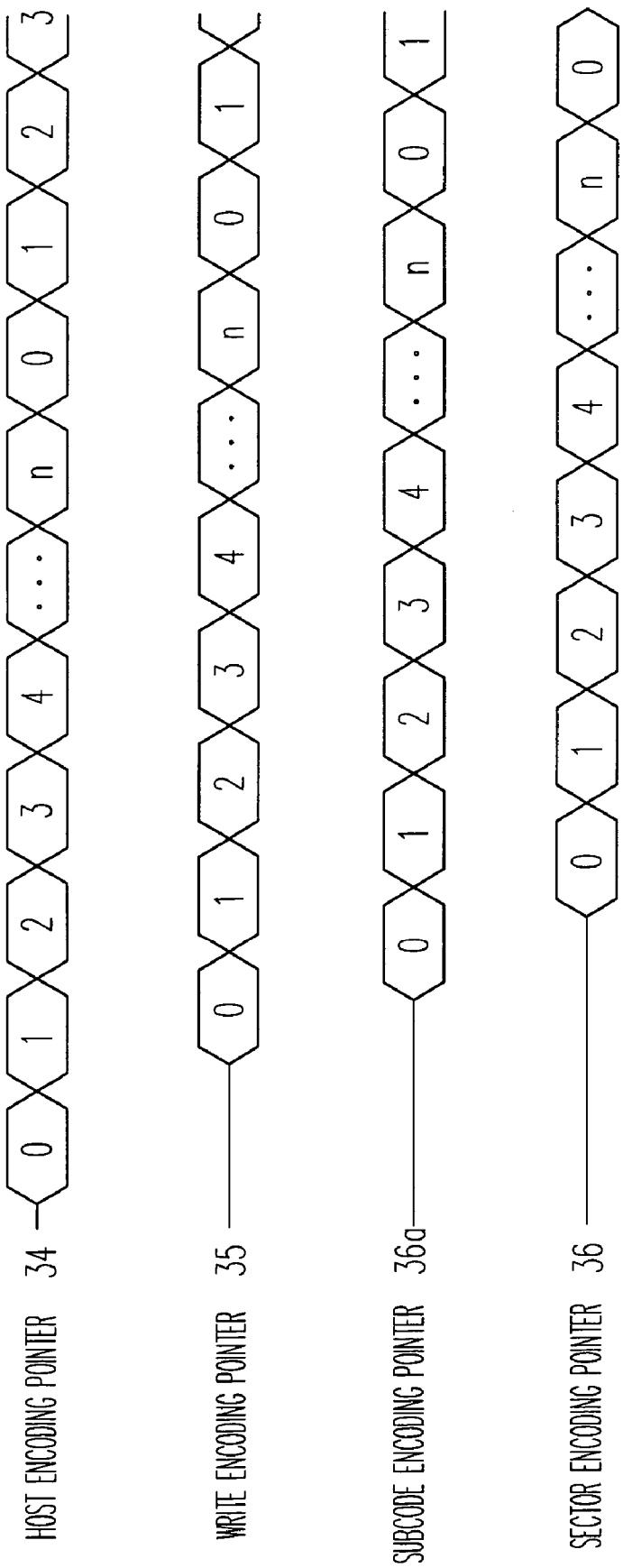
FIG. 5 is a timing diagram illustrating the encoding operation of the buffer memory shown in FIG. 3.

FIGS. 4 and 5 are timing diagrams respectively illustrating the decoding operation and encoding operation of the buffer memory shown in FIG. 3. Referring to the timing diagram of the decoding operation in FIG. 4, the numbers 0, 1, 2 . . . , m indicate the pages of the decoding buffer 30a the decoding pointers are pointing to currently. When the subcode decoding pointer 31a points to the PAGE 0 and lasts for a short time, the sector decoding pointer 31 also points to the PAGE 0, which is because only a short time is needed for processing the subcode. When the sector decoding pointer 31 points to the PAGE 1, i.e. the sector processing unit has finished processing the corresponding data in the PAGE 0, the read decoding pointer 32 starts to point to the PAGE 0. When the sector decoding pointer 31 points to the PAGE 3 and the read pointer 32 points to the PAGE 2, the host decoding pointer 33 starts to point to the PAGE 0. Furthermore, when the decoding pointer 31~33 point to the PAGE m and the process has been finished, the PAGE 0 is pointed to again. Referring to the timing diagram of the encoding operation in FIG. 5, the numbers 0, 1, 2 . . . , n indicate the pages of the encoding buffer 30b the encoding pointers are pointing to currently, the timing diagram is similar to that in the FIG. 4. When the subcode decoding pointer 34 points to the PAGE 0 and lasts for a short time, the write encoding pointer 35 also points to the PAGE 0, which is because only a short time is needed for processing the subcode. The write encoding pointer 35, the subcode encoding pointer 36a and the sector encoding pointer 36 then starts in a time sequence, for example, as shown in FIG. 5.

In summary, according to the present invention, in the buffer management device, the management method for buffer memory, and the record and reproduction apparatus using the same, since two sets of pointers to manage the parts of the buffer memory needed for decoding and encoding respectively are used, the buffer memory has better efficiency of switching between the read operation and the write operation.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A buffer management device used for managing a buffer memory inside a record and reproduction apparatus for an optical storage medium, wherein the buffer memory includes a decoding buffer and an encoding buffer, and the decoding buffer and the encoding buffer include a plurality of pages respectively, the buffer management device comprising:

a set of decoding pointers including a sector decoding pointer for indicating which page of the decoding buffer is used for processing sector data, a read decoding pointer for indicating which page of the decoding buffer is used for reading data, and a host decoding pointer for indicating which page of the decoding buffer is used by a host for processing data; and a set of encoding pointers including a sector encoding pointer for indicating which page of the encoding buffer is used for processing sector data, a write encoding pointer for indicating which page of the encoding buffer is used for writing data, and a host encoding pointer for indicating which page of the encoding buffer is used by the host for processing data, wherein when the record and reproduction apparatus is recording data into and reproducing data from the optical storage medium at one time, the buffer management device simultaneously accesses the buffer memory by using the set of decoding pointers and the set of encoding pointers respectively.

2. The buffer management device as claimed in claim 1, wherein the set of decoding pointers further includes a subcode decoding pointer for indicating which page of the decoding buffer is used for processing subcode, and the set of encoding pointers further includes a subcode encoding pointer for indicating which page of the encoding buffer is used for processing subcode.

3. The buffer management device as claimed in claim 1, wherein when the record and reproduction apparatus is reading data from the optical storage medium, the data is registered into the decoding buffer of the buffer memory first, any page of the decoding buffer used for registering the data will be pointed by the sector decoding pointer, the read decoding pointer and the host decoding pointer in sequence and processed correspondingly.

4. The buffer management device as claimed in claim 1, wherein when the record and reproduction apparatus is writing data into the optical storage medium, the data is registered into the encoding buffer of the buffer memory first, any page of the encoding buffer used for registering the data will be pointed by the host encoding pointer, the write encoding pointer and the sector encoding pointer in sequence and processed correspondingly.

5. The buffer management device as claimed in claim 1, wherein the pages of the decoding buffer and the pages of the encoding buffer are of the same quantity.

6. The buffer management device as claimed in claim 1, wherein the buffer memory includes a dynamic random access memory (DRAM).

7. The buffer management device as claimed in claim 1, wherein the record and reproduction apparatus for the optical storage medium includes a readable and writable DVD drive.

8. The buffer management device as claimed in claim 1, wherein the optical storage medium includes one of a CD optical disc, a DVD optical disc and other optical storage media.

9. The buffer management device as claimed in claim 1, wherein the buffer management device is configured in a system-on-chip (SOC).

10. A record and reproduction apparatus for an optical storage medium, comprising:
a read/write unit used for physically writing data into or reading data from the optical storage medium;
an encoding unit used for encoding the data before the data is written into the optical storage medium;
a decoding unit used for decoding the data after the data is read from the optical storage medium;
a buffer memory including a decoding buffer and an encoding buffer, wherein the decoding buffer and the encoding buffer include a plurality of pages respectively;
a buffer memory interface coupled to the buffer memory; and
a buffer management device coupled to the buffer memory interface comprising:
a set of decoding pointers, wherein the set of decoding pointers includes a sector decoding pointer for indicating which page of the decoding buffer is used for processing sector data, a read decoding pointer for indicating which page of the decoding buffer is used for reading data, and a host decoding pointer for indicating which page of the decoding buffer is used by a host for processing data; and
a set of encoding pointers, wherein the set of encoding pointers includes a sector encoding pointer for indicating which page of the encoding buffer is used for processing sector data, a write encoding pointer for indicating which page of the encoding buffer is used for writing data, and a host encoding pointer for indicating which page of the encoding buffer is used by the host for processing data,
wherein when the record and reproduction apparatus is recording data into and reproducing data from the optical storage medium, at one time, the buffer management device simultaneously accesses the buffer memory by using the set of decoding pointers and the set of encoding pointers respectively.

11. The record and reproduction apparatus for the optical storage medium as claimed in claim 10, wherein the pages of the decoding buffer and the pages of the encoding buffer are of the same quantity.

12. The record and reproduction apparatus for the optical storage medium as claimed in claim 10, wherein the buffer memory includes a DRAM.

13. The record and reproduction apparatus for the optical storage medium as claimed in claim 10, wherein the record and reproduction device for the optical storage medium includes a readable/writable DVD drive.

14. The record and reproduction apparatus for the optical storage medium as claimed in claim 10, wherein the optical storage medium includes one of a CD optical disc, a DVD optical disc and other optical storage media.

15. The record and reproduction apparatus for the optical storage medium as claimed in claim 10, wherein the buffer management device is configured in a system-on-chip.

16. A management method used for managing the buffer memory inside a record and reproduction apparatus for an optical storage medium, the management method comprising:
providing the buffer memory including a decoding buffer and an encoding buffer, wherein the decoding buffer and the encoding buffer include a plurality of pages respectively;
providing a set of decoding pointers including a sector decoding pointer for indicating which page of the decoding buffer is used for processing sector data, a read decoding pointer for indicating which page of the decoding buffer is used for reading data, and a host decoding pointer for indicating which page of the decoding buffer is used by a host for processing data, wherein when the record and reproduction apparatus is reading data from the optical storage medium, the data is registered into the decoding buffer of the buffer memory first, any page of the decoding buffer used for registering the data will be pointed by the sector decoding pointer, the read decoding pointer and the host decoding pointer in sequence and processed correspondingly; and
providing a set of encoding pointers including a sector encoding pointer for indicating which page of the encoding buffer is used for processing sector data, a write encoding pointer for indicating which page of the encoding buffer is used for writing data, and a host encoding pointer for indicating which page of the encoding buffer is used by the host for processing data, wherein when the record and reproduction apparatus is writing data into the optical storage medium, the data is registered into the encoding buffer of the buffer memory first, any page of the encoding buffer used for registering the data will be pointed by the host encoding pointer, the write encoding pointer and the sector encoding pointer in sequence and processed correspondingly;

wherein when the record and reproduction apparatus is recording data into and reproducing data from the optical storage medium at one time, the buffer management device simultaneously accesses the buffer memory by using the set of decoding pointers and the set of encoding pointers respectively.

17. The management method as claimed in claim 16, wherein the pages of the decoding buffer and the pages of the encoding buffer are of the same quantity.

18. The management method as claimed in claim 16, wherein the buffer memory includes a dynamic random access memory.

19. The management method as claimed in claim 16, wherein the record and reproduction device for the optical storage medium includes a readable/writable DVD drive, and the optical storage medium includes one of a CD optical disc, a DVD optical disc and other optical storage media.

20. The management method as claimed in claim 16, wherein the buffer management device is configured in a system-on-chip.

* * * * *